United States Patent [19]

Ackeret

[11] 4,238,899
[45] Dec. 16, 1980

[54] PICTURE VIEWER

[75] Inventor: Peter Ackeret, Küsnacht, Switzerland

[73] Assignee: Licinvest AG, Chur, Switzerland

[21] Appl. No.: 943,364

[22] Filed: Sep. 18, 1978

[30] Foreign Application Priority Data

Sep. 20, 1977 [DE] Fed. Rep. of Germany ....... 2742345

[51] Int. Cl.³ .......................................... G09F 11/30
[52] U.S. Cl. ..................................... 40/513; 40/490; 40/511
[58] Field of Search ................. 40/513, 511, 509, 508, 40/490, 375, 380, 381

[56] References Cited

U.S. PATENT DOCUMENTS

| 3,377,727 | 4/1968 | Weggeland | 40/511 |
| 3,495,345 | 2/1970 | Weggeland | 40/490 |
| 3,783,540 | 1/1974 | Barclay | 40/511 |
| 4,057,920 | 11/1977 | Weggeland | 40/513 |

Primary Examiner—John F. Pitrelli
Attorney, Agent, or Firm—H. Dale Palmatier

[57] ABSTRACT

A picture viewer for displaying, progressively, all of the pictures in a stack of pictures, including a housing with a viewing window, picture supporting elements behind the window, a space to confine the pile of pictures behind the supporting elements, a slider in the housing to be withdrawn and then returned, a retention element to strip an individual picture off one end of the stack as the slider is withdrawn from the housing, a separator traversing one side of the stack to engage the side edges of the pictures to allow relative sliding movement between the individual picture and the stack. The supporting elements being movable to drop the displayed picture from the level of the window, and a guide surface directing the individual picture stripped from the stack onto the supporting elements adjacent the window.

26 Claims, 25 Drawing Figures

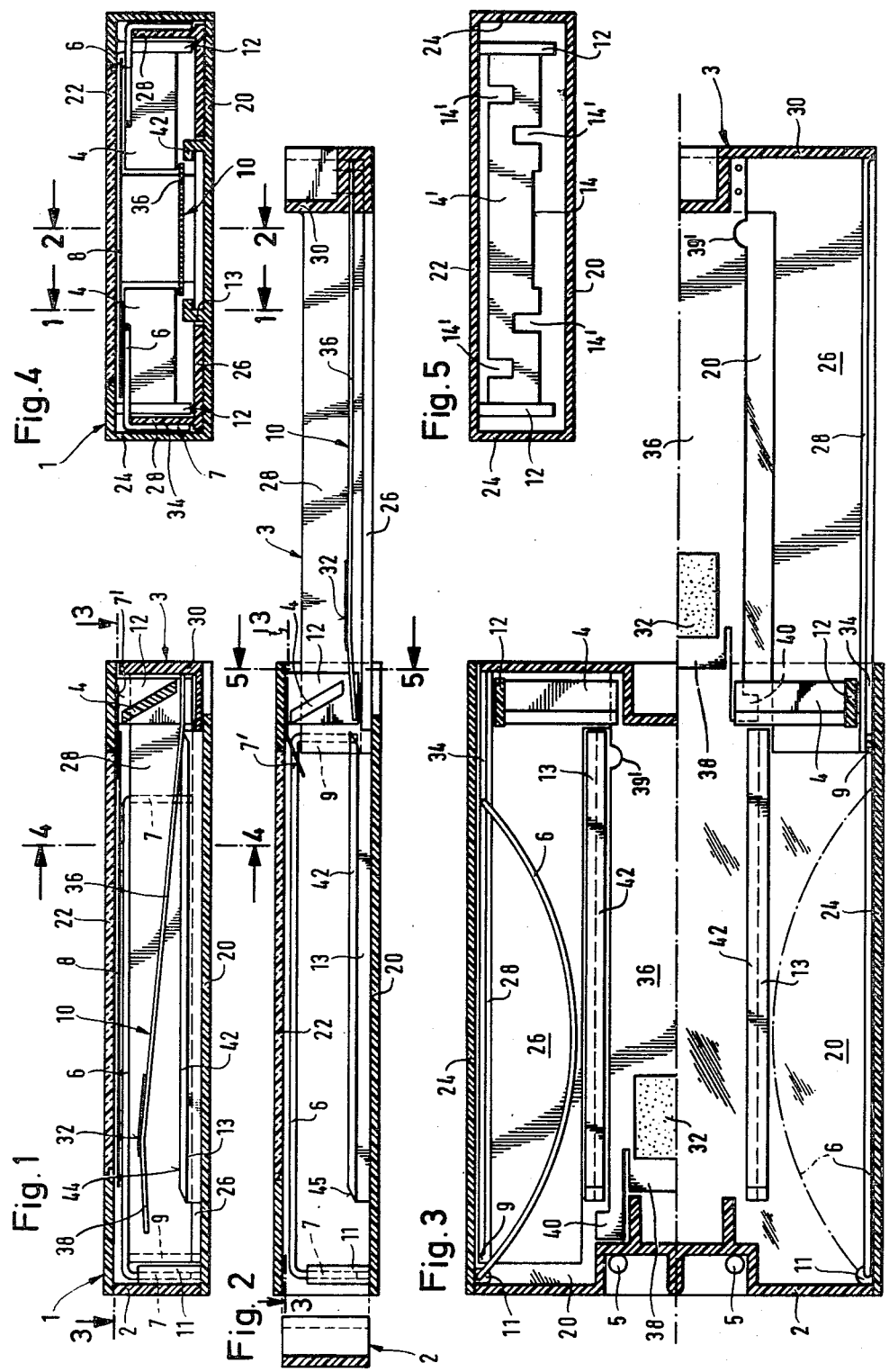

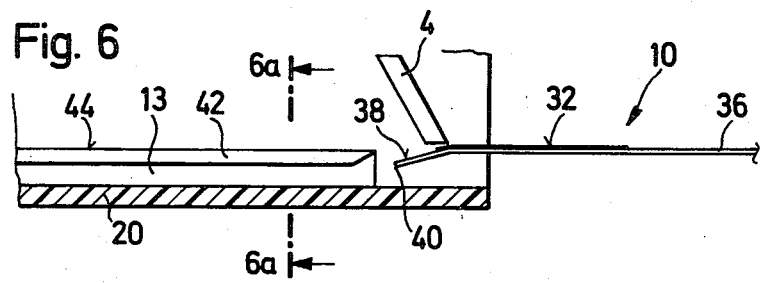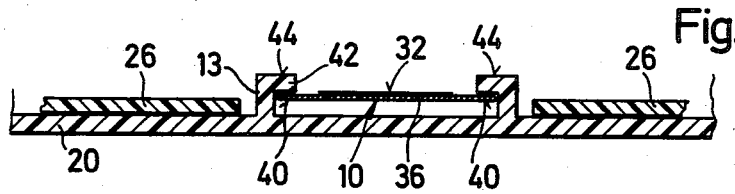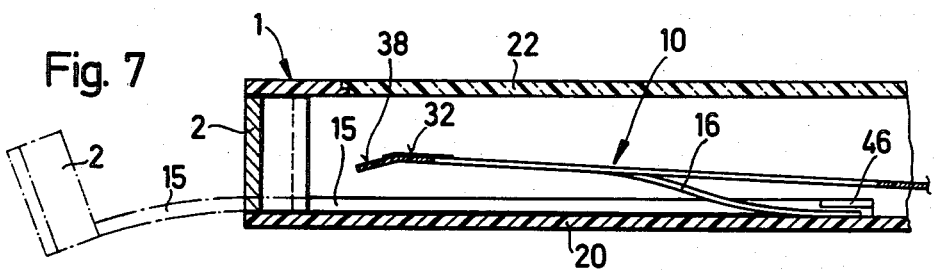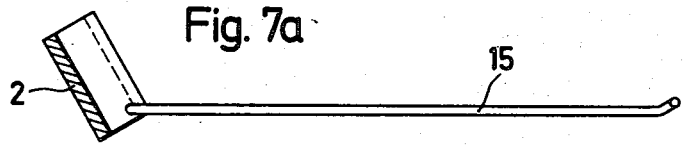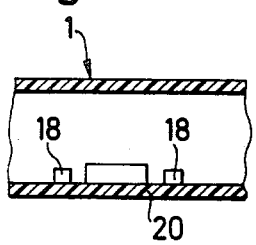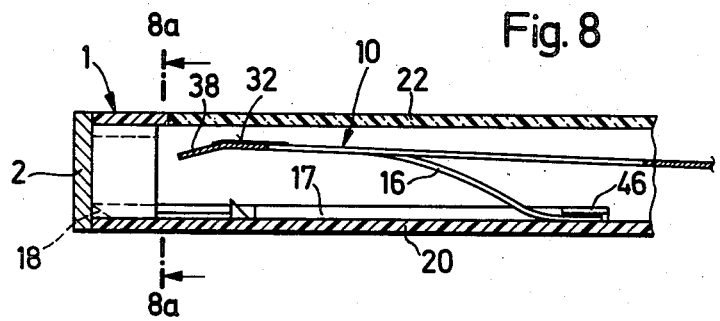

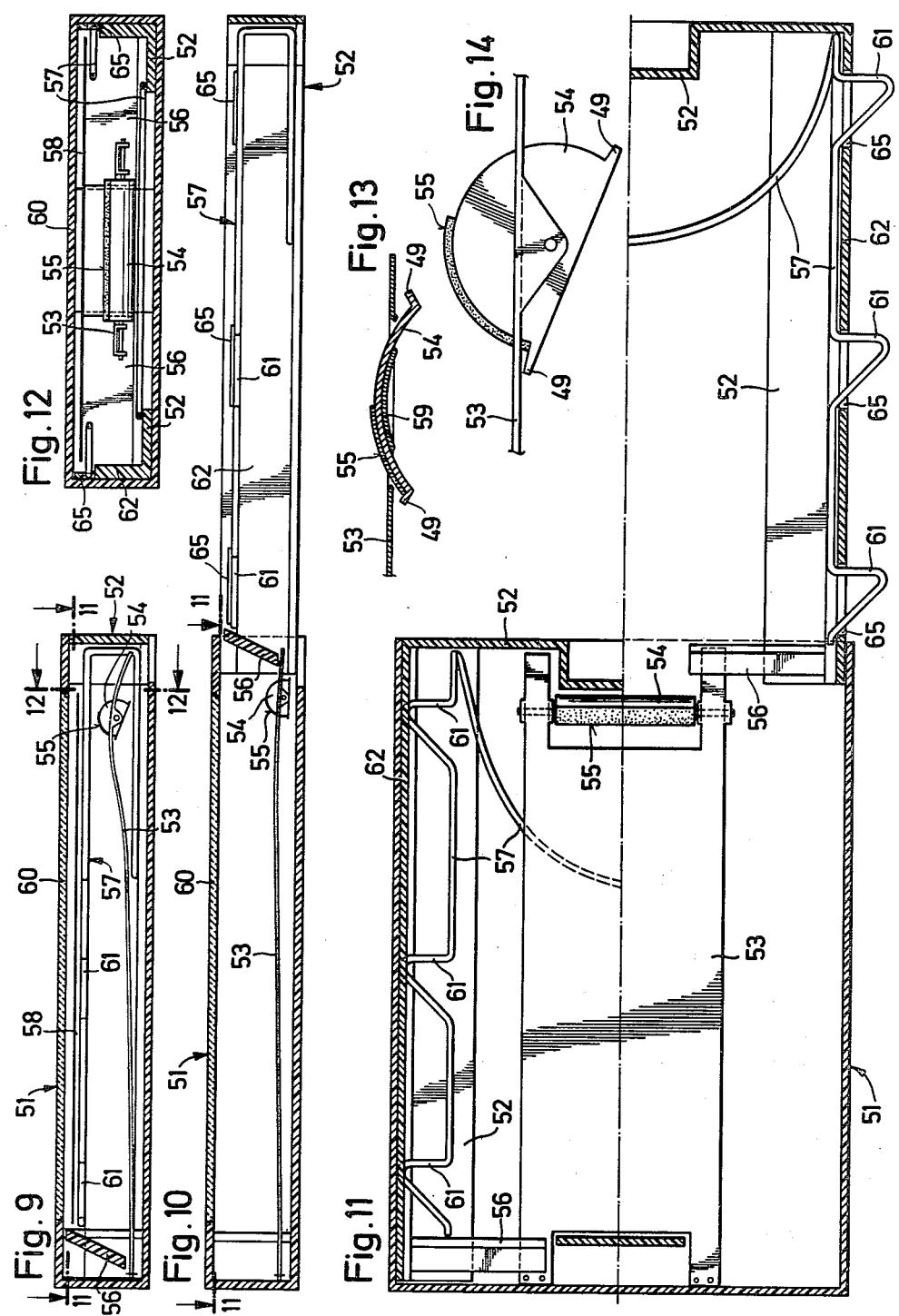

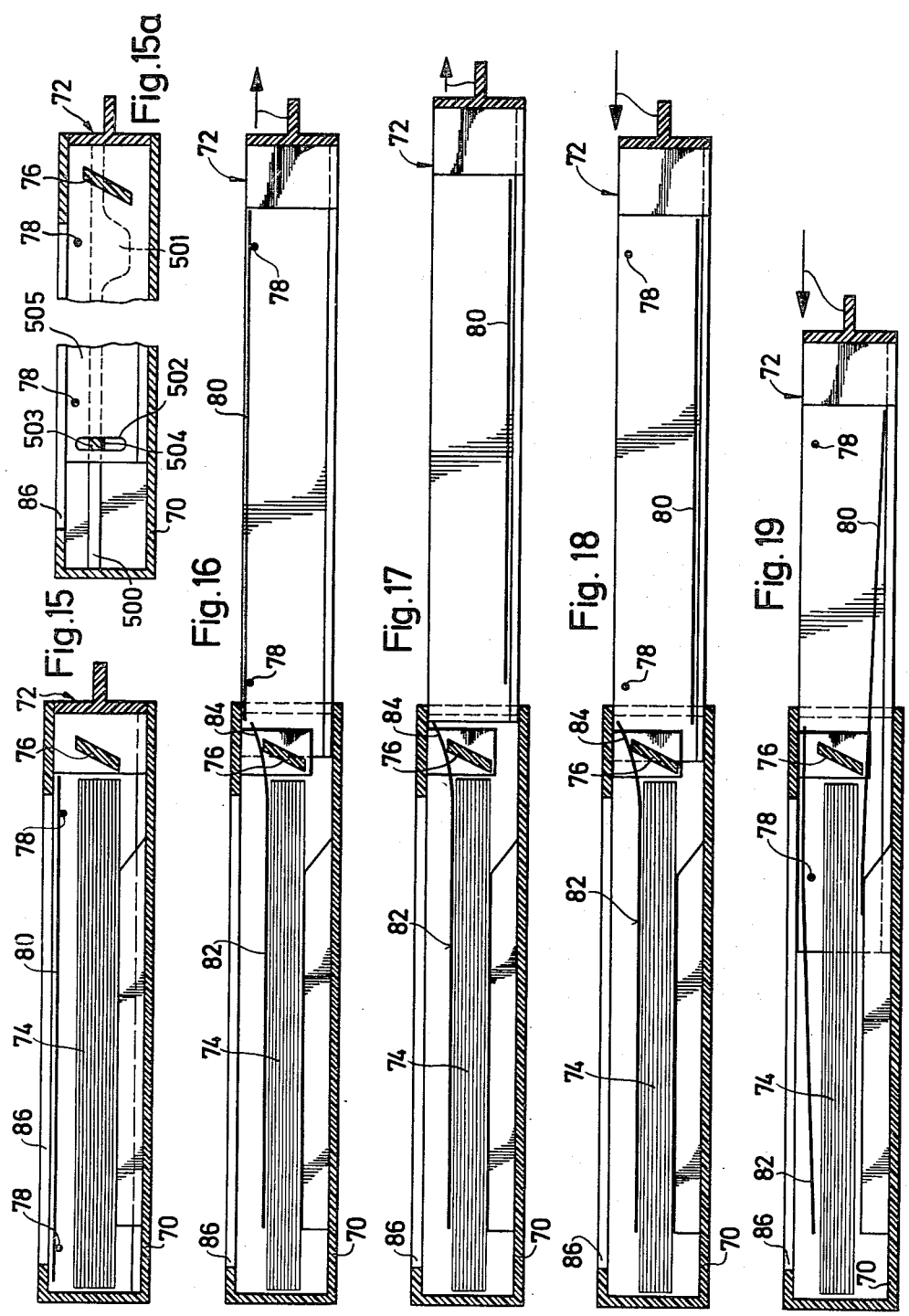

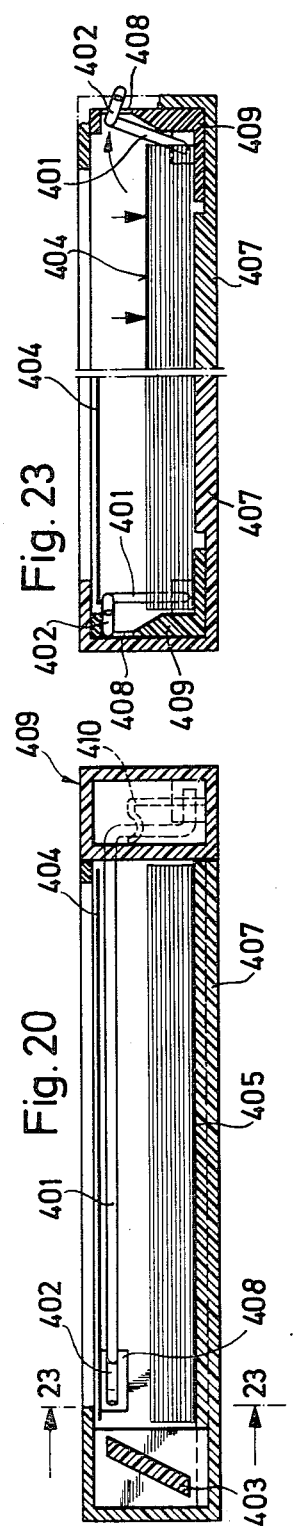

PICTURE VIEWER

The invention relates to a picture viewer with a change mechanism.

BACKGROUND OF THE INVENTION

A device of this kind is known, for example, from DT-AS No. 22 12 135, for paper pictures; corresponding constructions for photoplates are disclosed in German Patent Specifications Nos. 179 675 and 224 700.

The principle of these known devices is relatively simple. By means of a hook attached to the slider member, the uppermost picture of a pile of pictures lying in the housing is drawn away over a separator and when the slider member is pushed back in again is guided under the separator which is arranged in the housing, so that it goes under the pile. In all of the known constructions a spring arrangement is provided which presses against the pile from below so as to urge the uppermost picture (or the uppermost photoplate) against the viewing window or an illumination aperture in the housing.

This means that when reinserting the picture or plate it must be pushed between the spring arrangement and the pile disposed in the housing, with the result that the relative displacement occurring under spring pressure, on account of the high forces of friction, may result in the surface of the picture being scratched. In addition the spring arrangement must be carefully dimensioned since it must be able to extend enough to press a single picture against the viewing window (when the "pile" consists only of one picture), but must be sufficiently pliable still to permit the picture to be inserted when the pile is of maximum thickness. When the device is not in use the pictures are nevertheless constantly under the spring pressure, which when, for example, the photos are not quite dry, can lead to sticking. The removal and insertion of the pictures under spring pressure is troublesome and complicated for the user.

SUMMARY OF THE INVENTION

The problem of the present invention is to create an improved picture viewer avoiding numerous difficulties by applying extremely little or no spring pressure at all of the pictures against the viewing window.

Simply to remove the spring or make it very weak would not be satisfactory, for in that case the picture to be viewed, depending on the height of the pile and the curvature of the pictures, would be separated or spaced to a greater or lesser extent from the viewing window. Accordingly a type of support member must be formed by support elements which when the device is closed support the uppermost picture right up against the viewing window.

When the picture is being changed, the support member must "disappear" so that the picture can fall onto the pile. The support member is then restored and reinserted. In the preferred embodiment the picture is the one that previously was at the bottom of the pile so that, contrary to the state of the art, it is not the uppermost picture which is transported to the bottom but the bottom-most picture which is transported to the support member above the pile.

The support member should be tilted away, spread open or pivoted away or removed in some other manner at the latest when the slider member is fully withdrawn, and must be active again at the latest when reinsertion of the slider member begins again.

To change the entire pile it is possible, as is also customary in the state of the art, to arrange a removal flap on the end wall remote from the slider member, wherein it is not necessary for the removal operation to make the support member "disappear", since the pictures are lying loosely. It is also possible, however, to provide a construction in which the bottom-most picture of the pile is held in the housing and the slider member takes with it the remaining pictures, including that on the support member. In this case the support member (the supporting elements) is arranged on the slider member and it will in general be simpler to disable the transporter arranged in the housing in order, for removal of the entire pile, also to extract by means of the slider member the picture otherwise remaining in the housing. This dispenses with the requirement for a separate lid for the removal of the entire pile. The disabling of the transporter for the removal of the pile is, however, advantageous also in the construction mentioned first. Finally, it is also possible, however, even in this reversed construction, to leave the support elements in the housing and transport the picture from the bottom of the housing up to the support member. The slider member must in this case too remove the picture previously disposed on the support member together with the remaining pile.

For the transporter, instead of using a hook, which in the case of curved pictures or pictures with damaged edges is unreliable, an adhesive covering enabling planar engagement with the pictures can be employed, which preferably during the return stroke of the slider member, can be automatically disabled for the purpose of protecting the surface of the pictures, for example, by being retracted into a slot in the base or the like.

DESCRIPTION OF THE DRAWINGS

FIG. 1 shows in schematic section the closed device;

FIG. 2 shows the device in a similar representation to FIG. 1 but with the slider member drawn out, FIG. 3 is a somewhat diagrammatic section view at 3—3 of FIG. 1 and illustrating the inside of the device with half the slider member diagrammatically drawn out, and the other half of the latter being shown within the housing, FIG. 4 is a cross-section through the device along the line 4—4 of FIG. 1, viewed in the direction of the arrow, FIG. 5 is a representation similar to that of FIG. 4 but with a different design of separator, FIG. 6 is a detail, in schematic longitudinal section, to illustrate the disabling of the transporter, FIG. 6a is a section along the line 6a—6a of FIG. 6, FIG. 7 is a partial sectional view at the lid end of the housing showing a modified form and a shifted position of the lid, FIG. 7a shows another alternative arrangement of the relation between the lid and disabling wire, FIG. 8 shows in partial longitudinal section another modified form for disabling the transporter when opening the lid, FIG. 9 shows a longitudinal section view of another modified form, FIG. 10 is a longitudinal section view of the form of FIG. 9 and with the slider member drawn out, FIG. 11 is a diagrammatic section view at 11—11 of FIG. 9 and illustrating the inside of the device with half the slider member diagrammatically drawn out and the other half of the slider member within the housing, FIG. 12 is a transverse section view along the line 12—12 of FIG. 9, FIG. 13 is a detail section view through another modified form of transporter, FIG. 14 is an enlarged detail elevation view of the transporter of FIGS. 9-12, FIGS. 15-19 are longitudinal section views through another modified form of the invention and show the various operating positions thereof; FIG. 15a is a detail longitudinal section with the pile removed and illustrating the individual picture transporter, FIGS. 20-22 are longitudinal section views of still another modified form of the invention in the various operating positions thereof, FIG. 23 is a diagrammatic transverse section view at 23—23 of FIG. 20 showing one half the slider within the housing and the other half drawn out of the housing.

DETAILED SPECIFICATION

FIG. 1 shows a housing or frame 1 with a base plate 20, a viewing window 22, side walls 24 (FIG. 3) and a pile removal slide 2, which is shown detached from the housing in FIG. 2. The slider member 3 having a base plate 26, lateral bars 28 and an end bar 30, is slidably mounted in the housing. The separator or pile transporter 4 is fixed in the housing by arranging it between two lugs 12 which project downwards from the top of the housing. The cross-sectional shape of the separator is best illustrated in FIGS. 1 and 2.

There extends in the middle, along the slider member, an individual picture transporter arrangement, consisting of a leaf spring 10, on which an adhesive covering 32 is arranged at least at the end closer to the lid 2. The lateral bars 28 of the slider member are guided between the lugs 12 and the lateral walls 24 of the housing.

In two posts 11 close to the side walls 24 and the lid 2 of the housing, in each case an end portion, projecting downwards, of a wire spring 6 is accommodated, which spring is curved towards the middle of the housing in the shape of an arch and its other end 7, likewise curved downwards, is accommodated loosely in a slot 34 which is provided between the lateral bar 28 of the slider member and the side wall 24 of the housing. An abutment 9, projecting outwards up to the side wall 24, is formed on the rear end, that is the end facing the lid 2, of the slider member lateral bars.

The lid 2 can be fixed to the housing 1, for example, by means of studs 5.

It is assumed that a single picture 8 is disposed between the window 22 and the arches of the springs 6. A pile of pictures (not shown) is arranged in the housing between the transporter 10 or its adhesive covering 32 and the underside of the arches of the springs 6. If the slider member 3 is now pulled, the pile is held back in the housing by the separator 4, but not the bottom-most picture engaged by the adhesive covering 32. This picture is moved outwards by the separator and slides past under the separator 4. As shown in FIG. 4, the separator is in two parts, so that the middle region of it is open and consequently the transporter arrangement can pass between the two parts of the separator. When the abutments 9 strike the freely movable arms 7 of the springs 6 these are driven outwards, the arches of the springs 6 being straightened. The individual picture 8 which was hitherto disposed on the spring arches is therefore no longer supported and can fall downwards with the assistance of the auxiliary springs 7'. It thus falls, as the uppermost picture, onto the pile held back by the separator.

FIG. 5 shows an embodiment of the separator or pile transporter 4' which differs from that in FIG. 4 in that the separator is in this case continuous, but a recess 14 is provided for the transporter arrangement 10 to pass through. Further indentations 14' permit passage of push lugs of the slider provided instead of bar 20.

The transporter 10 has as a support for the adhesive covering 32 a spring 36 that is slightly biased in an upward direction, the contact pressure of which is adequate to take along a single picture. In the fully drawn out position of the slider member (FIG. 2) small auxiliary springs (not shown) provided between the adhesive covering only in the middle of the spring, press that edge of the picture taken along which is nearer the separator slightly upwards, so that when the slider member is pushed back this edge slides upwards along the outwardly facing inclined face of the separator, and is thus placed on the spring arches which when the slider member is returned are spread inwards again on account of the inherent resilience of the springs 6.

During the return stroke of the slider member the transporter must slide away under the pile disposed in the housing. Although the prestressing of the spring 36 is very weak, this return movement can nevertheless be very difficult if the adhesive covering 32 slides along the bottom-most picture. Therefore provision is made for the spring to be pushed down during the return stroke. As shown in FIG. 3, the rear-most end 38 (FIG. 6) of the leaf spring 36 is made slightly more pliable than the rest of the spring by reducing the cross section or the like, by incisions 39' or the like. This portion of weakened cross section has in the region of the front edge laterally projecting guide members 40 (see also FIG. 6a), and from the bottom 20 of the housing two cam bars 13 with inwardly facing guide edges 42 project upwards. The bottom 26 of the slider member is removed in the region between these cam bars 13.

When the slider member is drawn out the end portion 38 passes under the separator 4 and is pressed downwards by the latter so that the guide members 40, on pushing the slider member back in, pass under the guide edges 42 and thus press the adhesive covering 32 beneath the upper side 44 of the cam bars 13. The cam bars 13 may be of such a length that the spring 36 is not released again until close to the inner end position of the slider member and the adhesive covering 32 is placed, from below, against the now undermost picture of the pile. Upon pulling again, guide members 40 slide over chamfered edge 45 of the cam bar 13.

To remove the pile, the lid 2 is opened and the pile is shaken out, the picture 8 lying at the top also falling out. So that the undermost picture of the pile is not held fast by the adhesive covering 32 or does not have to be drawn out with great effort, the adhesive covering can be disabled by opening the lid 2, by, for example, the spring 36 being drawn under the level of the top 44 of the cam bars. For this purpose (see FIG. 7), a drive wire 15 is provided on the lid, at the housing end of which a guide member 46 engages over a guide spring arm 16 of the spring 36, projecting downards, and thus the spring is pulled downwards. In accordance with FIG. 7a the wire 15 can be pivotally joined to the lid 2 or integrally formed therewith, as shown in FIG. 7.

Since the transporter 10 is pulled to the right side in FIG. 7 relative to the housing, the guide member 46 could prevent this normal exchange motion of the pictures. Therefore, in the housing bottom 20, cam grooves are provided (not illustrated) engaged by studs or the like at the bottom side of guide members 46 and serving the purpose to keep guide member 46 in the closed position of lid 2 laterally offset with respect to spring arm 16, leaving the movement of the latter unprevented, while on the contrary upon pulling on lid 2, guide member 46 slides onto the free end of spring arm 16. Similar considerations apply to the embodiment of FIG. 7a.

FIGS. 8 and 8a show a further possibility of how the transporter 10 can be disabled by opening the lid. Two small wedges 18 are arranged on the lid 2 and a slideably mounted disabling member 46 is also mounted on the lid to disable the spring arm 16. By means of a rod 17, the lid, on opening, moves the member 46 to the left (in FIG. 8). The wedge 18 when the lid is introduced again, releases the rod and so the member 46 is returned to its starting position positively or under the force of a spring. Obviously the member 46 can also be operated by, for example, an abutment arranged in the base 20 of the housing, although operation by means of the lid is more advantageous. Alternatively the transporter may be normally disabled and only enabled after the beginning of the withdrawal of a picture.

In the construction described so far the picture is changed by the lowermost picture of the pile first of all being taken out along with the slider member, and only towards the end of the outward movement of the slider member the uppermost picture falls downwards out of the flat display region formed between the spring arches 6 and the housing viewing plate 22. If, accordingly, the device contains only one picture, the picture is returned to the display region only by operating the slider member twice: in the first cycle of movement the picture 8 falls downwards, and in the second cycle of movement it is guided out and introduced again into the region at the top. If, even in the case of a single picture, the picture change is to be effected directly, the support member must be removed at the beginning of the withdrawal of the slider member, so that the picture in question is taken along by the slider member to the outside.

It can be seen that it is also not possible in the embodiment according to FIG. 5 for the adhesive covering 32 to rub against the separator 4', since the recess 14 is of sufficiently large dimensions.

From the aforegoing arrangements it is possible for the designer quite easily to derive modifications that fall withifn the scope of the invention. For example, if the separator or pile transporter may be arranged on the slider member and the individual picture transporter may be mounted on the housing. Then each time the slider member is drawn out, the entire pile, including the picture in the display region is removed from the housing, with the exception of one picture retained in the housing.

In an alternative form supporting elements, designed similarly to the curved springs 6, may be on the slider member instead of on the housing. Such springs may be pushed to the side by striking against the lugs 12. This solution would provide the advantage of the support member, being formed by spring arches bent inwardly, when the slider member is fully drawn out, so that the picture cannot fall, even if the device is held in an approximately vertical position. On reintroduction, the springs are initially deformed and then bent inwardly as before.

Since the design and the operation of the first embodiment have been described in detail above, it is sufficient to outline the method of operation of the embodiment shown in FIG. 9-14 only briefly.

In this embodiment the transporter is disposed on the housing and the separator on the slider member, so that, as already mentioned above, the support member is also to be arranged on the slider member.

Disposed in the housing 51 are the slidable slider member 52 and a resilient tongue 53 with a rotatable segment 54, pivotable about its own axis, which is provided on a part of its surface with an adhesive covering 55.

Arranged on the slider member are a separator 56, which, as in the first embodiment, may be in two parts or continuous, and a curved supporting element 57, in the present case consisting of round wire.

According to FIG. 9, the flat display region is formed on the one side by the viewing plate 60 and on the other side by the supporting element 57 consisting of resilient wire, and a single picture 58 is shown in the region. Since this intermediate space is relatively narrow, a picture, even if it is arched or curved, lies fairly well against the plate 60. The remaining pictures are piled in the space beneath the supporting element 57 and—as described above for the first embodiment—are held by the resilient tongue 53 with a slight upward pressure.

On removing the slider member 52, the adhesive covering 55 arranged on the segment 54 holds back the lowermost picture, whereas the rest of the pile, including the picture disposed in the display region, are moved outwards with the slider member.

The supporting element 57 is bent to form triangular projections 61, which when the slider member is in the housing are pressed inwards and when the slider member is withdrawn can be deflected outwards, for which purpose the slider member has lateral slots in its upper lateral crossbars 62. When the slider member is fully drawn out (FIG. 11) all the triangular projections can pass outwardly through the slots, and the picture 58 hitherto lying in the display region falls downwards. If the device is not being used in the horizontal position, an auxiliary spring or the like can ensure that the picture 58 is prestressed in the direction of the pile.

Whilst pushing back or during the return stroke of the slider member, the picture remaining in the housing, hitherto held fast by the transporter 54, slides onto the inclined face of the separator 56 facing it, the upper edge of which separator is higher than the upper side of the supporting element 57, so that when the display region is restored during the return stroke of the slider member the picture is slid into the display region and does not, for example, fall back onto the pile. Since the rotatable segment 54, which forms the transporter, projects slightly beyond the resilient tongue 53, the picture hitherto held fast is moved upwards on the separator 56, which in turn, as shown in FIG. 12, has an aperture extending over the entire height or even only an aperture in the lowermost area, for the transporter 54.

During the return stroke of the slider member, the returned pile will slide over the transporter 54, but not at the same time contact with the adhesive covering 55, since the segment 54 is rotated so far that it is disabled and the lowermost picture of the pile can easily slide over the remaining smooth face of the element 54.

As a result of the adhesive friction, which is naturally present even on the smooth face of the segment, the segment is automatically turned during renewed withdrawal so that the adhesive covering 55 is at the top.

FIG. 13 shows a slightly different embodiment of the transporter, which in this case is in the form of a segment of a cylinder which can slide back and forth in an arcuate movement on a corresponding cylindrical bulging protuberance 59 on the resilient tongue 53, and has axially parallel end stops. Similar end stops 49 are shown also in FIG. 14, which again shows the transporter from FIG. 9 to 12 in an enlarged representation.

The means for disabling the driving function when the slider member is drawn out, described with reference to FIGS. 1 to 8a, may be similarly or analogously employed in this embodiment too, but obviously in this case an additional lid, like the lid 2, is not necessary, because then the slider member moves out the entire pile including the lowermost picture. For example, the resilient tongue 53 can be pressed under support ribs, by means of a slider member, or the segment 54 can be held fast in the disabled position by a knob accessible from the outside, or the like.

Obviously, instead of the rotatable segment 54 coated with an adhesive covering, a simple catch hook can also be used, provided that the pictures to be stacked are adequately thick and flat. It is obvious also that the separator, instead of supporting at the end face, can hold fast the pile at the side by means of friction.

A further embodiment is illustrated only schematically in the following with reference to the FIGS. 15-19.

FIG. 15 shows the housing 70, the slider member 72, the pile 74, the separator 76 and supporting elements 78, here indicated only as bars; their design may correspond to bars 57, 61 of FIGS. 9-14.

It is assumed that a picture 80 rests on the bars 78. When the slider member 72 (FIG. 16) is drawn out, the support elements 78 arranged in the slider member transport the uppermost picture 80 out and by means of a transporter (not shown) the uppermost picture 82 of the pile, lying under the support elements 80, is taken along a small distance.

When the slider member 72 is completely drawn out, the support elements 78 are disabled, indicated in FIG. 17, by simply being omitted. Then, when the slider member is pushed in again very slightly (FIG. 18), the support arrangement is brought back into the starting position and runs under the raised edge 84 of the picture 82, so that the picture is moved into the display region, formed between the support elements 78 and the viewing aperture 86.

In FIGS. 15-19 it has not been illustrated, for sake of clarity, how the uppermost picture 80 has been shifted a small distance by means of the transporter. In addition to this possibility to shift the uppermost picture a small distance, the picture may be turned, bulged, or simply lifted from the pile at least at its edge adjacent the slider opening. The purpose is to facilitate the reinsertion of the support element between this picture and the remaining pile. Lifting, turning, bulging or shifting of the picture, preferably occurs by means of a separating element which engages the picture side facing away from the pile. The separating element may act by means of suction, of electrostatic or magnetic attraction, by means of a bonding compound or a gluing compound or finally be means of a so-called "burdock" system. Eventually, the picture is pretreated at its side facing the separating element to facilitate or even permit the movement of the picture by means of said separating element.

A simple system elected from the possibilities mentioned above, is illustrated in FIG. 15a. In the lateral wall of the housing a cam groove 500 extends parallel to the slider movement, and has a widened portion 501 extending in direction to the pile. The drawer side bar 505 adjacent this side wall has an elongated hole 502 extending perpendicularly with respect to said cam groove 500. A shaft or transporter 503 having preferably a non-circular section shape, extends transversely over the slider and through its symmetrically disposed elongated holes 502 and into the grooves 500. Upon pulling of the slider, thus, shaft 503 moves together with the slider in outward direction, guided along the groove 500. Along the free portion of shaft 503, a bonding coating 504 as a transporting medium is provided. Adjacent the outermost end position the shaft is within the widened portion 501 and is pushed downwardly by gravity or by means of a compression spring disposed, e.g., in elongated hole 502, the bonding coating 504 engaging the uppermost picture 82 of the pile, lifting it, and transporting it to the positions of FIGS. 16, 17 disposed in the housing. In this way, the separating motion of said one picture from the remaining pile simply indicated in FIGS. 15-19 may be obtained.

The last embodiment is shown in FIGS. 20-23. The support elements 401 are a pair of L-shaped curved yokes, which are mounted at one end in the slider member and can pivot, urged downwards by means of spring 410, as soon as their lateral projections 402 have passed the end edges of the housing as the slider member is pulled out. The picture disposed above the support elements then falls down onto the pile taken along the slider member, whereas an individual picture is retained below in the housing by an adhesive element or other transporter not shown. On reinserting the slider member, the separator 403 engages beneath the edge of the picture 405 which is lifted onto the yokes 401 again pivoted inwards. In this embodiment the distance from the viewing window can be minimal. FIG. 23 permits recognition of the shape of window 408 in drawer 409 through which the offset elbows 402 extend.

The device may be provided with further modifications alternatively or in combination, in order to improve its use.

These modifications include pliable support at the back face, means to hang the device as a frame, interchangeable additional frames to be fastened by some means at the front face and having different shapes and surface treatments, the biasing of the slider by means of a spring into its fully opened or fully closed position, the division of the housing wall comprising the window into a multiplicity of windows each one related to a pile of pictures, and another one to a pile of text cards, picture and text eventually being disposed on a common information carrier. Further, the window wall of the housing may be provided with spaces to permit a user to make notes thereon.

Further, there is the possibility to provide a space within the device, preferably stationary within the housing, to store, e.g., the negative belonging to the photo negative disposed in the slider. Finally, the device may be provided at its front and on its rear face with a window each in which case, of course, two different sliders are mounted in parallel.

What is claimed is:

1. A picture viewer for a pile of pictures, comprising enclosure means including a frame defining a viewing window and a slider reciprocably mounted on the frame, the frame and slider having relative obverse and reverse sliding movements in opposite directions along the window, the enclosure means also defining a picture compartment having one end adjacent the window to contain a pile of pictures with a picture at one end disposed at said one end of the compartment and adjacent the window, a picture changing mechanism adjacent the picture compartment and presenting a displayed picture to the window, the picture changing mechanism moving the displayed picture away from the window and into the pile and removing a new picture off one end of the pile and moving the new picture to the window for display in response to such obverse and reverse movement of the frame and slider, said picture changing mechanism including a pile transporter and an individual picture transporter, one of the transporters being connected with the frame and movable therewith and the other of the transporters being connected with the slider and movable therewith, the pile transporter being disposed at one side of the compartment to engage one side of the pile of pictures, the picture transporter being disposed at one end of the compartment to engage an individual picture at the corresponding end of the pile of pictures, the transporters producing relative movement of the pile of pictures and of the individual picture for presenting the individual picture at the window for display, and the picture changing mechanism also including support elements on the enclosure means and adjacent the window supporting the picture being displayed, and operating means connected with the support elements and moving the support elements out of supporting relation to the displayed picture to release the displayed picture and make provision to support an individual picture removed by the transporter from the pile and then reinserted.

2. The picture viewer according to claim 1 wherein the individual picture transporter is disposed on the frame with the support elements interposed between the transporter and the viewing window.

3. The picture viewer according to claim 2, wherein the individual picture transporter includes a retentive element confronting the window in spaced relation therewith to engage the lowermost picture in the pile.

4. The picture viewer according to claim 3, and means for disabling the retentive element during the reverse movement of the frame and slider.

5. The picture viewer according to claim 1, and the support elements being mounted on the slider member and moving the picture lying on the support elements with the slider and away from the window during the obverse movement, said individual picture transporter being on the frame and lying along at least a part of the length of the path of the slider movement, and the pile transporter being disposed adjacent the support elements on the slider and guiding the individual picture onto the support elements on the reverse movement of the slider and frame.

6. The picture viewer according to claim 1, wherein auxiliary elements convey the picture into the space beneath the support elements.

7. The picture viewer according to claim 1, wherein the enclosure means has a lid permitting removal of a picture pile.

8. The picture viewer according to claim 1, wherein the slider and frame are biased by means of a spring to move in one direction of such relative obverse and reverse movements.

9. The picture viewer according to claim 1, wherein the frame has two viewer windows, and an additional slider.

10. The picture viewer according to claim 1, wherein the window is divided into at least two individual windows for separate or common pictures.

11. The picture viewer according to claim 1, wherein storing space, preferably disposed stationarily in the frame to receive negative strips belonging to photo positives are disposed in the slider.

12. The picture viewer according to claim 1, and said support elements being connected with the slider for sliding movement therewith to carry the displayed picture out of confronting relation with the window.

13. The picture viewer according to claim 12, and the pile transporter being connected with the slider for moving the pile of pictures with the slider out of confronting relation to the window, and the individual picture transporter being connected with the frame for movement therewith and relative to the slider and pile transporter.

14. The picture viewer according to claim 12, and the pile transporter being connected with the frame to maintain the pile in confronting relation with the window, and the individual picture transporter being connected with the slider for movement therewith to remove a picture from the pile for display at the window.

15. The picture viewer according to claim 1, wherein said support elements are springs, means to deform such springs during relative obverse and reverse movement of the frame and slider.

16. The picture viewer accordig to claim 15, wherein the support elements are bent of an integral resilient steel bar.

17. The picture viewer according to claim 1, wherein the support elements are movable across the edge of the window and out of supporting relation with the picture adjacent the window.

18. The picture viewer according to claim 2, wherein the support elements are resiliently biased in supporting position.

19. The picture viewer according to claim 17, the frame having a lid openable for removal of the pile of pictures, and means connected with the lid and rendering the individual picture transporter inoperative in response to removal of the lid.

20. The picture viewer according to claim 17, and the pile transporter is mounted on the slider and separator means connected with the slider to engage the individual picture at the upper end of the pile and to remove such individual picture by shifting, turning, bulging or lifting with respect to the remaining pile into a position facilitating the reinsertion of the support element between said individual picture and the remaining pile during relative reverse movement of the frame and slider.

21. The picture viewer according to claim 20, wherein said separator means engages the face of the individual picture and has means to lift said individual picture from the pile.

22. The picture viewer according to claim 21, and including a picture in the compartment and having means thereon for attractive cooperation with said separator means.

23. The picture viewer according to claim 1 or 17, wherein the individual picture transporter is disposed on the slider and the pile transporter is disposed on the frame.

24. The picture viewer according to claim 23, wherein the support elements are disposed on the frame and means moving the support elements out of supporting relation to the pictures in response to said obverse movement of the slider and frame.

25. The picture viewer according to claim 6, and said support elements being connected with the frame for sliding movement therewith, the operating means moving the support elements transversely of the compartment to drop the displayed picture away from the window.

26. A picture viewer comprising a substantially rectangular frame defining a cavity adapted to the size of a stack of pictures, said cavity being divided by picture support elements in a one-picture space beneath a viewing window of said frame and a stack space beneath said support elements, and a picture change mechanism comprising a slider reciprocable relative to said frame and parallel to the viewing window thereof, said support elements being movable out of their space-dividing position in response to said slider reciprocation.

* * * * *